(12) United States Patent
Moriyama et al.

(10) Patent No.: US 8,390,559 B2
(45) Date of Patent: Mar. 5, 2013

(54) DISPLAY DRIVING APPARATUS, DISPLAY MODULE PACKAGE, DISPLAY PANEL MODULE, AND TELEVISION SET

(75) Inventors: Seiichi Moriyama, Kyoto (JP); Satoshi Endou, Osaka (JP); Kenji Yamashita, Osaka (JP); Hiroyuki Kageyama, Kyoto (JP)

(73) Assignee: Panasonic Corporation, Osaka (JP)

( * ) Notice: Subject to any disclaimer, the term of this patent is extended or adjusted under 35 U.S.C. 154(b) by 125 days.

(21) Appl. No.: 13/155,786

(22) Filed: Jun. 8, 2011

(65) Prior Publication Data

US 2011/0234578 A1     Sep. 29, 2011

Related U.S. Application Data

(63) Continuation of application No. PCT/JP2009/005377, filed on Oct. 15, 2009.

(30) Foreign Application Priority Data

Dec. 25, 2008   (JP) ................................ 2008-331627

(51) Int. Cl.
  *G09G 3/38* (2006.01)
  *G09G 3/28* (2006.01)
  *G06F 3/038* (2006.01)
(52) U.S. Cl. .............................. 345/99; 345/204; 345/60
(58) Field of Classification Search .................... 345/60, 345/98–99, 204, 213
  See application file for complete search history.

(56) References Cited

U.S. PATENT DOCUMENTS

| 5,489,867 | A | 2/1996 | Tamanoi |
| 6,624,798 | B1 | 9/2003 | Aoki et al. |
| 7,002,544 | B2 | 2/2006 | Sekido |
| 7,116,137 | B2 | 10/2006 | Nautiyal et al. |
| 7,239,300 | B2 | 7/2007 | Shimizu |
| 7,576,712 | B2 | 8/2009 | Takagi et al. |
| 7,728,832 | B2 | 6/2010 | Okamura |
| 7,821,487 | B2 | 10/2010 | Tanaka et al. |
| 7,839,397 | B2 | 11/2010 | Moriyama et al. |
| 7,940,231 | B2 * | 5/2011 | Moriyama et al. .............. 345/60 |
| 8,049,746 | B2 * | 11/2011 | Moriyama et al. ............ 345/213 |
| 2003/0098833 | A1 | 5/2003 | Sekido et al. |
| 2004/0189579 | A1 | 9/2004 | Shimizu |
| 2006/0152167 | A1 | 7/2006 | Takagi et al. |
| 2007/0070005 | A1 | 3/2007 | Okamura |

(Continued)

FOREIGN PATENT DOCUMENTS

| JP | 07-013509 | 1/1995 |
| JP | 08-305319 | 11/1996 |

(Continued)

OTHER PUBLICATIONS

International Search Report, dated Jan. 19, 2010, for corresponding International Application No. PCT/JP2009/005377.

*Primary Examiner* — William Boddie
*Assistant Examiner* — Andrew Schnirel
(74) *Attorney, Agent, or Firm* — McDermott Will & Emery LLP

(57) ABSTRACT

A display driving apparatus according to an implementation of the present invention includes: a first delay circuit that generates latch control signals changing with different timings; a second delay circuit that generates falling delay signals and rising delay signals by delaying the latch control signals; a delay selection circuit that (i) selects the falling delay signals or the rising delay signals when pixel data for adjacent display output terminals have changed in different directions and (ii) selects the latch control signals when pixel data for adjacent display output terminals have changed in the same direction; and a step control circuit that drives the display output terminals with timings of the signals selected by the delay signal circuit.

13 Claims, 11 Drawing Sheets

U.S. PATENT DOCUMENTS

| | | |
|---|---|---|
| 2007/0152947 A1 | 7/2007 | Tanaka et al. |
| 2008/0036749 A1 | 2/2008 | Moriyama et al. |
| 2009/0289933 A1 | 11/2009 | Moriyama et al. |
| 2010/0194737 A1 | 8/2010 | Okamura |
| 2011/0007065 A1 | 1/2011 | Tanaka et al. |

FOREIGN PATENT DOCUMENTS

| | | |
|---|---|---|
| JP | 10-123998 | 5/1998 |
| JP | 10-187093 | 7/1998 |
| JP | 2953342 | 7/1999 |
| JP | 3135748 | 12/2000 |
| JP | 2003-162262 | 6/2003 |
| JP | 2004-301946 | 10/2004 |
| JP | 2006-171330 | 6/2006 |
| JP | 2007-086584 | 4/2007 |
| JP | 2007-171597 | 7/2007 |
| JP | 2008-216952 | 9/2008 |

* cited by examiner

US 8,390,559 B2

DISPLAY DRIVING APPARATUS, DISPLAY MODULE PACKAGE, DISPLAY PANEL MODULE, AND TELEVISION SET

CROSS REFERENCE TO RELATED APPLICATION

This is a continuation application of PCT application No. PCT/JP2009/005377 filed on Oct. 15, 2009, designating the United States of America.

BACKGROUND OF THE INVENTION (1) Field of the Invention

The present invention relates to a display driving apparatus, a display module package, a display panel module, and a television set. The present invention relates in particular to the display driving apparatus that outputs n drive signals each of which drives a panel electrode, to n display output terminals in a predetermined cycle according to display data for a single line including n pixel data.

(2) Description of the Related Art

In recent years, a plasma display panel (PDP) has been attracting attention as a high-definition display panel having a flat large screen. This PDP is provided with, as pixels, discharge cells arranged in a matrix. Furthermore, the PDP displays an image using emission of light resulting from electric discharge of the discharge cells.

A PDP of a general AC-type includes display electrodes arranged parallel to one another and data electrodes arranged perpendicular to the display electrodes. A display driving apparatus of the PDP drives the data electrodes, which means a drive-target of the display driving apparatus is a capacitive load.

In the meantime, along with advancements in the PDP, such as a larger screen, a higher definition, and a higher luminance, a display driving apparatus that drives the PDP has also been required to achieve a multi-output, a lower electromagnetic interference (EMI), and lower power consumption. Therefore, it has been becoming more important to suppress power consumption when driving a data electrode and resultant heat of driving, and reduce an EMI noise resulting from a change of data.

Furthermore, when different voltages are applied to two data electrodes, the electrodes function as a capacitance. In other words, a capacitive load is generated. The display driving apparatus consumes a lot of power when driving the capacitive load. In order to address the above, a display driving apparatus disclosed by Patent Reference 1: U.S. Pat. No. 7,116,137 is known as a conventional technique for reducing power consumption of the display driving apparatus.

The display driving apparatus according to the Patent Reference 1 converts display data to a predetermined voltage level and outputs the converted display data to a display output terminal connected to a data electrode. Furthermore, the display driving apparatus according to the Patent Reference 1 can reduce driving power with a two-step voltage driving method.

Specifically, the display driving apparatus according to the Patent Reference 1 includes a common floating potential line connected to plural display output terminals in a floating state via a selection switch in a form of wired OR connection.

Furthermore, the display driving apparatus according to the Patent Reference 1 detects a change in a voltage level prior to and subsequent to a change of the display data. The display driving apparatus according to the Patent Reference 1 controls: the display output terminal of which the voltage level changes to temporarily enter a high-impedance (Hi-Z) state, with a predetermined timing (within a panel-nondisplay period for switching the display data); and at the same time, the selection switch so that the display output terminal is connected to the common floating potential line. The control causes all of the display output terminals where data changes depending on the switching of the display data to have temporarily blocked display output and connected to the common floating potential line.

Accordingly, the display output terminals of which the voltage level changes are short-circuited, so that capacitive charge accumulated between the display output terminals to which an H (High) level or an L (Low) level is outputted immediately before is moved. This allows the display output terminal of the H level and the display output terminal of the L level to be balanced in number, causing the common floating potential line in a floating state to stay at a certain voltage.

For example, in the display output terminals of which the voltage level changes, when the H level display output terminal and the L level display output terminal are the same in number, the common floating potential line ideally becomes VDD/2 (VDD is the H level voltage of the display output terminal). Therefore, it is sufficient for the display driving apparatus to drive from VDD/2 to GND or to VDD. With this, the display driving apparatus according to the Patent Reference 1 can reduce driving power consumption.

Further, a conventional technique that reduces the EMI when display data changes is disclosed by Patent Reference 2: Japanese Patent No. 2953342.

In the technique disclosed by the Patent Reference 2, plural data electrodes that display pixel data for a single line is divided into plural groups of data electrodes, and a timing for a display output is sequentially shifted between the groups of data electrodes. With this, the technique disclosed by the Patent Reference 2 can group the number of data that changes at the same time into group units, thereby reducing a peak current. According to the above, the technique disclosed by the Patent Reference 2 can reduce the EMI that occurs.

SUMMARY OF THE INVENTION

However, a further reduction of the EMI in such a display driving apparatus has been demanded.

In view of the foregoing, an object of the present invention is to provide a display driving apparatus, a display module package, a display panel module, and a television set, which are capable of reducing the EMI by lowering a peak current.

In order to achieve the object described above, a display driving apparatus according to an aspect of the present invention which outputs n drive signals to n display output terminals in a predetermined cycle according to n pixel data included in display data for a single line, n being an integer equal to or greater than two, and each of the n drive signals driving a panel electrode, the display driving apparatus includes: a change judgment unit configured to (i) judge whether or not each of the n pixel data has changed from pixel data of an immediately previous cycle, and when judging that each of the n pixel data has changed, further (ii) judge whether each of the n pixel data has changed from a first logical value to a second logical value or from the second logical value to the first logical value; n−1 transition direction match judgment units each provided between an adjacent two of the display output terminals and configured to judge whether or not the pixel data for the two adjacent display output terminals have changed in different directions; a first delay unit configured to generate n first timing signals based on a horizontal synchronization signal that synchronizes with the cycle, the n first timing signals corresponding one-to-one with the n display output terminals and changing with different timings; n−1 second delay units configured to delay n−1 first timing signals among the n first timing signals to generate n−1 second timing signals corresponding one-to-one with the n−1 display output terminals; n−1 delay selection units corresponding one-to-one with the n−1 display output terminals and each configured to (i) select a corresponding one of the second timing signals when the pixel data for a corresponding one of the display output terminals and the pixel data for another one of the display output terminals which is adjacent to the corresponding display output terminal have changed in different directions, and (ii) select a corresponding one of the first timing signals when the pixel data for the corresponding display output terminal and the pixel data for the other display output terminal adjacent to the corresponding display output terminal have changed in a same direction; and a control unit configured to drive the corresponding display output terminal with a timing of change of the first timing signal or the second timing signal selected by each of the n−1 delay selection units.

According to the structure, the display driving apparatus according to the aspect of the present invention drives the n display output terminals with different timings. With the above structure, the display driving apparatus according to the aspect of the present invention can lower a peak current, thereby reducing the EMI.

Furthermore, the display driving apparatus according to the aspect of the present invention further delays the driving operation when pixel data for adjacent display output terminals transit in mutually opposite directions, that is, when the drive load capacity increases by such transition. With the above structure, the display driving apparatus according to the aspect of the present invention can further lower a peak current, thereby further reducing the EMI.

Furthermore, the control unit may be configured to (i) drive one of the display output terminals to a first voltage when the pixel data for the corresponding display output terminal is the first logical value, and (ii) drive one of the display output terminals to a second voltage when the pixel data for the corresponding display output terminal is the second logical value, the second voltage being higher than the first voltage, each of the n−1 second timing signals may include a falling timing signal and a rising timing signal, the n−1 second delay units may be configured to (i) delay the first timing signals by a first delay amount to generate the n−1 falling timing signals corresponding one-to-one with the n−1 display output terminals, and (ii) delay the first timing signal by a second delay amount to generate the n−1 rising timing signals corresponding one-to-one with the n−1 display output terminals, the second delay amount being larger than the first delay amount, and each of the n−1 delay selection units may be configured to (i) select the falling timing signal when the pixel data for the corresponding display output terminal and the pixel data for the other display output terminal adjacent to the corresponding display output terminal change in different directions, and the pixel data for the corresponding display output terminal changes from the second logical value to the first logical value, and (ii) select the rising timing signal when the pixel data for the corresponding display output terminal and the pixel data for the other display output terminal adjacent to the corresponding display output terminal change in different directions, and the pixel data for the corresponding display output terminal changes from the first logical value to the second logical value.

According to this structure, the driving operation is delayed further in the rising case (when the pixel data change from the first logical value to the second logical value) where the drive load capacity increases, than in the falling case (when the pixel data change from the second logical value to the first logical value). With the above structure, the display driving apparatus according to the aspect of the present invention can further lower a peak current, thereby further reducing the EMI.

Furthermore, the first delay unit may be configured to generate the n first timing signals such that a timing of change is delayed sequentially in an order of an arrangement of the n display output terminals, the transition direction match judgment units may correspond one-to-one with the n−1 display output terminals and may be each configured to judge whether or not the pixel data for a corresponding one of the display output terminals and the pixel data for another one of the display output terminals which is located immediately before the corresponding display output terminal in the order of the arrangement have changed in different directions, and each of the n−1 delay selection units may be configured to (i) select the corresponding second timing signal when the pixel data for the corresponding display output terminal and the pixel data for the other display output terminal located immediately before the corresponding display output terminal in the order of the arrangement have changed in different directions, and (ii) select the corresponding first timing signal when the pixel data for the corresponding display output terminal and the pixel data for the other display output terminal located immediately before the corresponding display output terminal in the order of the arrangement have changed in a same direction.

Furthermore, the display driving apparatus may further include: n level shift units corresponding one-to-one with the n pixel data and the n display output terminals, and configured to shift a voltage level of corresponding pixel data and output a first voltage or a second voltage; and a step voltage providing unit configured to provide a step voltage which is at a voltage level between the first voltage and the second voltage, wherein the control unit may be configured to perform control such that the display output terminal corresponding to the pixel data judged to have changed by the change judgment unit is provided with: the step voltage provided by the step voltage providing unit during a first time period included in each of the cycle; and either the first voltage or the second voltage outputted from the corresponding level shift units during a second time period that is contained in the cycle and subsequent to the first time period, and the control unit may be configured to determine at least one of the first time period and the second time period based on a timing of change of either the first timing signal or the second timing signal selected by each of the n−1 delay selection units According to the structure, the display driving apparatus according to the aspect of the present invention performs two-step voltage driving which first drives the display output terminal to the step voltage, and then drives the display output terminal to the first voltage or the second voltage (an H level or an L level). With the above structure, the display driving apparatus according to the aspect of the present invention can reduce power consumption.

Furthermore, in the display driving apparatus according to the aspect of the present invention, since the step voltage is provided by the step voltage providing unit, the display output terminal is provided with the same voltage without exception during the first time period without depending on a pattern of display data. With the above structure, the display driving apparatus according to the aspect of the present invention can reduce power consumption more compared to the technique disclosed by the Patent Reference 1.

Furthermore, the display driving apparatus may further include: n latch units corresponding one-to-one with the n pixel data, and configured to hold the corresponding pixel data with a timing based on the horizontal synchronization signal and output the pixel data which has been held; n first switches corresponding one-to-one with the n pixel data, the n level shift units, and the n display output terminals, each of the n first switches being connected between an output terminal of a corresponding one of the level shift units and a corresponding one of the display output terminals; and n second switches corresponding one-to-one with the n pixel data, the n first switches, and the n display output terminals, each of the n second switches being connected between an output terminal of the step voltage providing unit and a corresponding one of the display output terminals, wherein the control unit may be configured to keep the first switch off and keep the second switch on during the first time period, and keep the second switch off and keep the first switch on during the second time period, each of the first switch and the second switch corresponding to the pixel data judged to have changed by the change judgment unit.

Furthermore, the first delay unit may be configured to generate the n timing signals by providing the horizontal synchronization signal with a delay that is different for each timing signal, and the control unit is configured to keep the n first switches off and keep the n second switches on during the first time periods that are different from one another and based on the timing of change of the n timing signals.

According to the structure, the display driving apparatus according to the aspect of the present invention drives the n display output terminals to the step voltage from the first voltage or the second voltage with different timings, and drives the n display output terminals to the first voltage or the second voltage from the step voltage with different timings. With the above structure, the display driving apparatus according to the aspect of the present invention can lower the peak current of both the driving to the step voltage and the driving to the first voltage and the second voltage from the step voltage, and thus it is possible to further reduce the EMI.

Furthermore, the control unit may be configured to keep one of the second switches off and keep a corresponding one of the first switches on during the first time period and the second time period in the case where the change judgment unit judges that the pixel data held by a corresponding one of the latch units has not changed.

According to this structure, the two-step voltage driving is performed only on the display output terminals of which the pixel data changes. With the above structure, the display driving apparatus according to the present invention can efficiently reduce power consumption.

Furthermore, the step voltage may be at an intermediate voltage level between the first voltage and the second voltage.

Furthermore, the control unit may be configured to keep the corresponding first switch and second switch not to be concurrently on.

According to this structure, the display driving apparatus according to the aspect of the present invention can avoid an instantaneous data conflict without fail. With this, the display driving apparatus according to the aspect of the present invention can reduce the EMI without fail.

Furthermore, the control unit may be configured to perform control such that the first switch is turned on after the second switch corresponding to the first switch is tuned off whenever the first switch is turned on, and that the second switch is turned on after the first switch corresponding to the second switch is turned off whenever the second switch is turned on.

It is to be noted that the present invention can also be realized as a display driving method including the characteristic components included in the display driving apparatus, as its steps. It is to be noted that the present invention can also be realized as a display module package, display panel module, and a television set which include such a display driving apparatus.

As described above, the present invention can present the display driving apparatus, the display module package, the display panel module, and the television set which are capable of reducing the EMI by lowering a peak current.

FURTHER INFORMATION ABOUT TECHNICAL BACKGROUND TO THIS APPLICATION

The disclosure of Japanese Patent Application No. 2008-331627 filed on Dec. 25, 2008 including specification, drawings and claims is incorporated herein by reference in its entirety.

The disclosure of PCT application No. PCT/JP2009/005377 filed on Oct. 15, 2009, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Embodiments of a display driving apparatus according to implementations of the present invention will be described in detail below with reference to the drawings.

First Embodiment

A display driving apparatus according to a first embodiment of the present invention performs two-step voltage driving on plural display output terminals with different timings. Furthermore, the display driving apparatus according to the first embodiment of the present invention further delays the driving operation when display data for adjacent display output terminals transit in opposite directions. According to the above structure, the display driving apparatus according to the first embodiment of the present invention can lower a peak current and thereby suppress the EMI.

First, a structure of the display driving apparatus according to the first embodiment of the present invention will be described.

Figure 1:
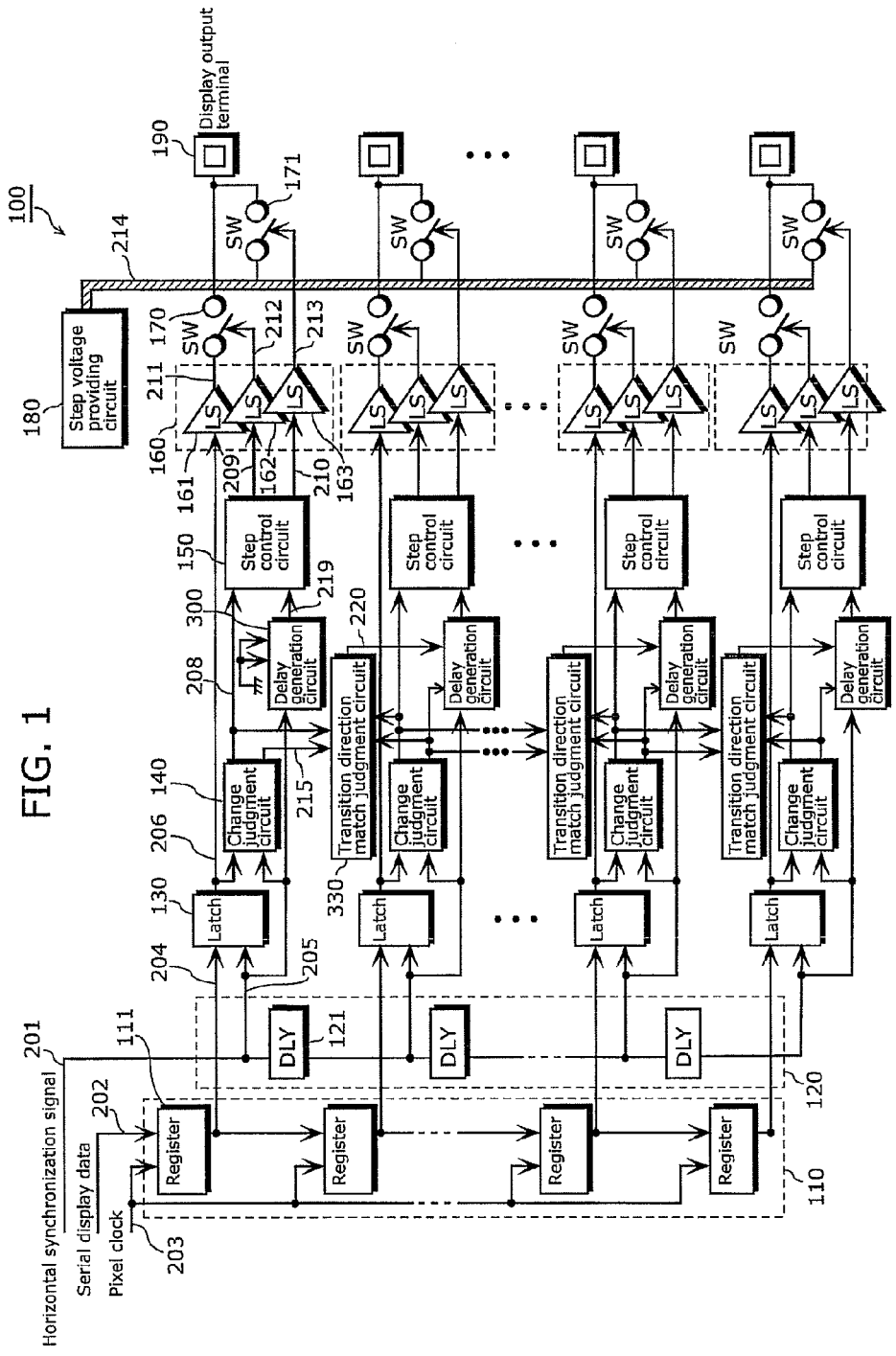
FIG. 1 is a diagram which illustrates a structure of a display driving apparatus according to a first embodiment of the present invention.

FIG. 1 is a block diagram which illustrates a structure of the display driving apparatus according to the first embodiment of the present invention.

The display driving apparatus 100 as illustrated in FIG. 1 receives n pixel data (n is an integer equal to or greater than two, for example, 192 or 388) contained in serial display data 202 for a single horizontal line, in a predetermined cycle, and outputs, according to the received n pixel data, n drive signals to n display output terminals 190, each of the n drive signals driving a panel electrode (data electrode) of a PDP.

The display driving apparatus 100 includes: a shift register 110; a first delay circuit 120; n first latch circuits 130; n change judgment circuits 140; n delay generation circuits 300; n−1 transition direction match judgment circuits 330; n step control circuits 150; n level shift circuits 160; n first switches 170; n second switches 171; a step voltage providing circuit 180; and n display output terminals 190.

The display driving apparatus 100 receives from outside a horizontal synchronization signal 201, serial display data 202, and a pixel clock 203.

The shift register 110 receives serial display data 202 for a single horizontal line using the pixel clock 203 and outputs the received serial display data 202 in parallel.

The serial display data 202 is a display data signal inputted serially from outside in order to drive the data electrode of the PDP. The serial display data 202 includes n pixel data 204 each corresponding to one of the pixels.

The shift register 110 includes n registers 111. The n registers 111 are connected in series. The n registers 111 store and output the respective n pieces of pixel data 204.

The pixel clock 203 is a clock inputted in synchronization with the serial display data 202. The pixel clock 203 is a clock for storing pixel data 204 inputted serially into one of the registers 111 and sequentially shifting the pixel data 204 stored in the register 111 to the other register 111 in the next stage. More specifically, the pixel clock 203 is a clock for storing the serial display data 202 for a single horizontal line into the shift register 110.

The shift register 110 receives the serial display data 202 for every pixel clock 203 and sequentially shifts the received pixel data 204 to store the serial display data 202 for a single horizontal line.

The first delay circuit 120 delays the horizontal synchronization signal 201, thereby generating n latch control signals 205 each of which changes with a different timing.

The horizontal synchronization signal 201 is a synchronization signal that is inputted with respect to each cycle of line data change (hereinafter also simply referred to as "cycle") of the serial display data 202 inputted from outside.

The first delay circuit 120 includes n−1 delay elements 121. Further, a delay amount of each of the n−1 delay elements 121 is the same. For example, the delay amount of a single delay element 121 is 0.2 n seconds, approximately. It is to be noted that at least one of the n−1 delay elements 121 may have a different delay amount.

Furthermore, the delay elements 121 delay n latch control signals 205 so that a delay becomes greater in the order of an arrangement of the display output terminals 190 (for example, in a direction from top to bottom in FIG. 1).

It is to be noted that each of the display output terminals 190 is associated with a corresponding one of the registers 111, a corresponding one of the latch control signals 205, a corresponding one of the latch circuits 130, a corresponding one of the change judgment circuits 140, a corresponding one of the delay generation circuits 300, a corresponding one of the step control circuits 150, a corresponding one of the level shift circuits 160, a corresponding one of the first switches 170, and a corresponding one of the second switches 171, as illustrated in FIG. 1. Furthermore, each of the n−1 transition direction match judgment circuits 330 is provided between two adjacent ones of the display output terminals 190. For example, the n−1 transition direction match judgment circuits 330 are provided for the respective n−1 display output terminals 190 which are included in the n display output terminals 190 other than the display output terminal 190 placed at the end (at the upper end in FIG. 1).

In the descriptions below, operations related to the corresponding constituent elements are indicated unless particularly mentioned. Since the structures of the constituent elements for the respective display output terminals 190 are the same, the constituent elements for one of the display output terminals 190 are explained as representatives.

The latch circuit 130 receives and holds pixel data 204 stored in the register 111 with a timing that a latch control signal 205 changes, and outputs the held pixel data 206.

The change judgment circuit 140 judges whether or not the pixel data 206 held in the latch circuit 130 has changed from the pixel data 206 held in an immediately previous cycle. When the pixel data 206 has changed, the change judgment circuit 140 further determines a transition direction in which the pixel data 206 has changed from that in the preceding cycle. That is, the change judgment circuit 140 determines whether the pixel data 206 has changed from the L level to the H level (rising) or from the H level to the L level (falling).

Figure 2:
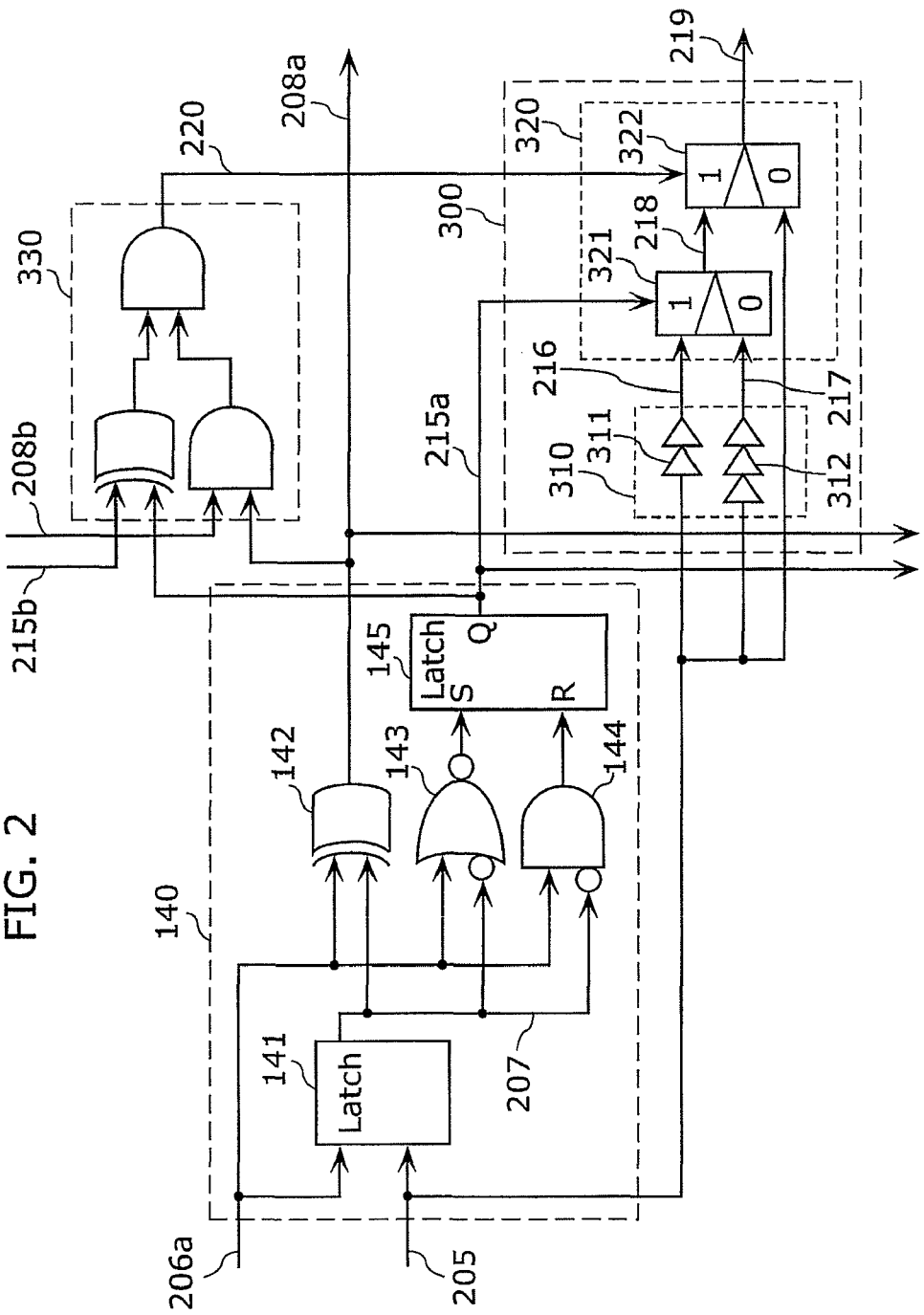
FIG. 2 is a circuit diagram which illustrates structures of a change judgment circuit, a delay circuit, a delay selection circuit, and a transition direction match judgment circuit.

FIG. 2 is a diagram which illustrates a circuit structure of the change judgment circuit 140, the delay generation circuit 300, and the transition direction match judgment circuit 330.

As shown in FIG. 2, the change judgment circuit 140 includes a latch circuit 141, an exclusive OR circuit 142, an OR circuit 143, an AND circuit 144, and a latch circuit 145.

The latch circuit 141 holds the pixel data 207 that has been held in the latch circuit 130 in the immediately previous cycle. The latch circuit 141 receives and holds the pixel data 206 outputted from the latch circuit 130 with a timing that the latch control signal 205 changes, and outputs the held pixel data 207. It is to be noted that the latch circuit 141 holds the pixel data 206 using a signal that changes with the same timing as or an earlier timing than the latch control signal 205 inputted into the latch circuit 130.

The exclusive OR circuit 142 judges whether or not the pixel data 206 held in the latch circuit 130 and the pixel data 207 held in the latch circuit 141 are the same and outputs a judgment signal 208 that indicates a result of the judgment. In other words, the exclusive OR circuit 142 judges whether or not the pixel data 206 held in the latch circuit 130 has been changed due to a line data change. More specifically, the exclusive OR circuit 142 judges that the pixel data 206 has not been changed due to a line data change when the pixel data 206 and the pixel data 207 are the same, and that the pixel data 206 has been changed due to a line data change when the pixel data 206 and the pixel data 207 are different.

The OR circuit 143 judges whether or not the pixel data 206 held by the latch circuit 130 is at the L level and the pixel data 207 held by the latch circuit 141 is at the H level. That is, the OR circuit 143 judges whether the pixel data 206 held by the latch circuit 130 has changed from the H level to the L level (falling) due to a line data change.

The AND circuit 144 judges whether or not the pixel data 206 held by the latch circuit 130 is at the H level and the pixel data 207 held by the latch circuit 141 is at the L level. That is, the AND circuit 144 judges whether the pixel data 206 held by the latch circuit 130 has changed from the L level to the H level (rising) due to a line data change.

The latch circuit 145 holds the transition direction determined by the OR circuit 143 and the AND circuit 144. Specifically, the latch circuit 145 holds the H level when the transition direction represents falling, and holds the L level when the transition direction represents rising. The latch circuit 145 outputs the held transition direction as a transition direction signal 215.

In FIG. 2 and in the following descriptions, one of the display output terminals 190 is indicated as a display output terminal 190a, and another one of the display output terminals 190 which is adjacent to the display output terminal 190a in an upward direction (in an upward direction in FIG. 1) is indicated as a display output terminal 190b. Furthermore, the pixel data 206, the judgment signal 208, and the transition direction signal 215, which are provided for the display output terminal 190a are indicated as pixel data 206a, a judgment signal 208a, and a transition direction signal 215a, respectively, and the pixel data 206, the judgment signal 208, and the transition direction signal 215, which are provided for the display output terminal 190b are indicated as pixel data 206b, a judgment signal 208b, and a transition direction signal 215b, respectively.

Using the judgment signal 208a, the transition direction signal 215a, the judgment signal 208b, and the transition direction signal 215b, the transition direction match judgment circuit 330 judges whether or not a transition direction of the pixel data 206a matches a transition direction of the pixel data 206b. Specifically, the transition direction match judgment circuit 330 judges, using the judgment signals 208a and 208b, whether or not both the pixel data 206a and 206b change. Furthermore, the transition direction match judgment circuit 330 determines, using the transition direction signals 215a and 215b, whether or not the pixel data 206a and 206b have different transition directions.

Furthermore, specifically, when both the pixel data 206a and 206b change and the pixel data 206a and 206b have different transition directions, the transition direction match judgment circuit 330 outputs a transition direction match judgment signal 220 at the H level. When at least one of the pixel data 206a and 206b does not change or when the pixel data 206a and 206b have the same transition direction though both the pixel data 206a and 206b change, the transition direction match judgment circuit 330 outputs a transition direction match judgment signal 220 at the L level.

The delay generation circuit 300 generates a timing control signal 219 that is the latch control signal 205 or is obtained by delaying the latch control signal 205. Specifically, when both the pixel data 206a and 206b change and the pixel data 206a and 206b have different transition directions, the delay generation circuit 300 outputs the timing control signal 219 obtained by delaying the latch control signal 205, and when the pixel data 206a and 206b have the same transition direction or when at least one of the pixel data 206a and 206b does not change, the delay generation circuit 300 outputs the latch control signal 205 as the transition direction match judgment signal 220.

This delay generation circuit 300 includes a second delay circuit 310 and a delay selection circuit 320.

The second delay circuit 310 delays the latch control signal 205 to generate a rising delay signal 216 and a falling delay signal 217. This second delay circuit 310 includes a first delay element 311 and a second delay element 312. The first delay element 311 delays the latch control signal 205 by a falling delay amount, to generate the falling delay signal 216. The second delay element 312 delays the latch control signal 205 by a rising delay amount, to generate the rising delay signal 217. The rising delay amount is greater than the falling delay amount.

The delay selection circuit 320 selects, using the transition direction signal 215 and the transition direction match judgment signal 220, one of the latch control signal 205, the falling delay signal 216, and the rising delay signal 217, and outputs the selected signal as the timing control signal 219. Specifically, when at least one of the pixel data 206a and 206b does not change or when the pixel data 206a and 206b have the same transition direction through both the pixel data 206a and 206b change, the delay selection circuit 320 selects the latch control signal 205. When the pixel data 206a and 206b have different transition directions and the transition direction of the pixel data 206a represents falling, the delay selection circuit 320 selects the falling delay signal. When the pixel data 206a and 206b have different transition directions and the transition direction of the pixel data 206a represents rising, the delay selection circuit 320 selects the rising delay signal.

This delay selection circuit 320 includes a first selection circuit 321 and a second selection circuit 322.

When the transition direction signal 215a is at the H level (falling), the first selection circuit 321 selects the falling delay signal 216, and outputs the selected falling delay signal 216 as a selection delay signal 218. When the transition direction signal 215a is at the L level (rising), the first selection circuit 321 selects the rising delay signal 217, and outputs the selected rising delay signal 217 as the selection delay signal 218.

When the transition direction match judgment signal 220 is at the H level (when the transition directions are different), the second selection circuit 322 selects the selection delay signal 218, and outputs the selected selection delay signal 218 as the timing control signal 219. When the transition direction match judgment signal 220 is at L the level (when at least one of the pixel data 206a and 206b does not change or when the transition directions are the same), the second selection circuit 322 selects the latch control signal 205, and outputs the selected latch control signal 205 as the timing control signal 219.

The delay selection circuit 320 for the display output terminal 190 placed at the upper end in FIG. 1 always selects the latch control signal 205.

With a timing of change of the timing control signal 219 selected by the delay selection circuit 320, the step control circuit 150 drives the display output terminal 190 for the delay selection circuit 320. Specifically, the step control circuit 150 generates, based on the timing control signal 219, a first switch control signal 209 that turns a first switch 170 on or off and a second switch control signal 210 that turns a second switch 171 on or off.

The level shift circuit 160 includes level shifters 161, 162, and 163.

The level shifters 161, 162, and 163 convert a voltage level of an inputted signal and output the signal having a converted voltage level. For example, the shift register 110, the first delay circuit 120, the latch circuit 130, the change judgment circuit 140, and the step control circuit 150 operate at a power supply voltage of 3 V (0 V of the L level, 3 V of the H level), and the level shifters 161, 162, and 163 output a signal having 0 V of the L level and 85 V of the H level by shifting a voltage level of a logical value of the pixel data 206 (the L level or the H level).

The level shifter 161 outputs the pixel data 211 by shifting a voltage level of the pixel data 206 held in the latch circuit 130. The level shifter 162 outputs a first switch control signal 212 by shifting a voltage level of a first switch control signal 209. The level shifter 163 outputs a second switch control signal 213 by shifting a voltage level of a second switch control signal 210.

The step voltage providing circuit 180 provides a step voltage 214 of VDD/2. Here, VDD is a voltage of the H level (for example, 85V) after converted by the level shift circuit 160.

A first switch 170 is connected between an output terminal of the level shifter 161 and a display output terminal 190.

A second switch 171 is connected between the display output terminal 190 and a common line through which the step voltage 214 is provided by the step voltage providing circuit 180. Here, the common line through which the step voltage 214 is provided by the step voltage providing circuit 180 is connected to all of the n second switches 171.

For example, both of the first switch 170 and the second switch 171 are a P channel metal-oxide semiconductor field-effect transistor (MOSFET).

The step control circuit 150 controls the step voltage 214 that is provided by the step voltage providing circuit 180 to be provided to the display output terminal 190 during a first time period that is different between the display output terminals 190 in the case where the change judgment circuit 140 judges that the pixel data 206 has been changed. The step control circuit 150 controls the H level or L level voltage outputted from the level shifter 161 to be provided to the display output terminal 190 during a second time period that is subsequent to the first time period and is different between the display output terminals 190.

More specifically, the step control circuit 150 keeps the first switch 170 off and the second switch 171 on during the first time periods that are different from one another and based on a timing of change of the n timing control signals 219. Subsequently, the step control circuit 150 keeps the second switch 171 off and the first switch 170 on during the second time periods that are different from one another and based on a timing of change of the n timing control signals 219.

This causes the display output terminal 190 to be temporarily provided with the step voltage 214 by the step voltage providing circuit 180. Subsequently, the display output terminal 190 is driven to the H level or the L level voltage by the level shifter 161.

When the change judgment circuit 140 judges that the pixel data 206 has not changed, the step control circuit 150 causes, during the first time period and the second time period, the display output terminal 190 to be provided with the H level or L level voltage which the level shifter 161 outputs to the display output terminal 190.

More specifically, the step control circuit 150 keeps the second switch 171 off and keeps the first switch 170 on during the first time period and the second time period.

With this, the display output terminal 190 is not provided with the step voltage 214 and is provided with the H level or the L level voltage by the level shifter 161 in the case where the pixel data 206 has not changed.

The step control circuit 150, for n sets of the first switch 170 and the second switch 171, keeps the first switch 170 off and the second switch 171 on during the first time periods that are different from one another, and keeps the second switch 171 off and the first switch 170 on during the second time periods that are different from one another.

Figure 3:
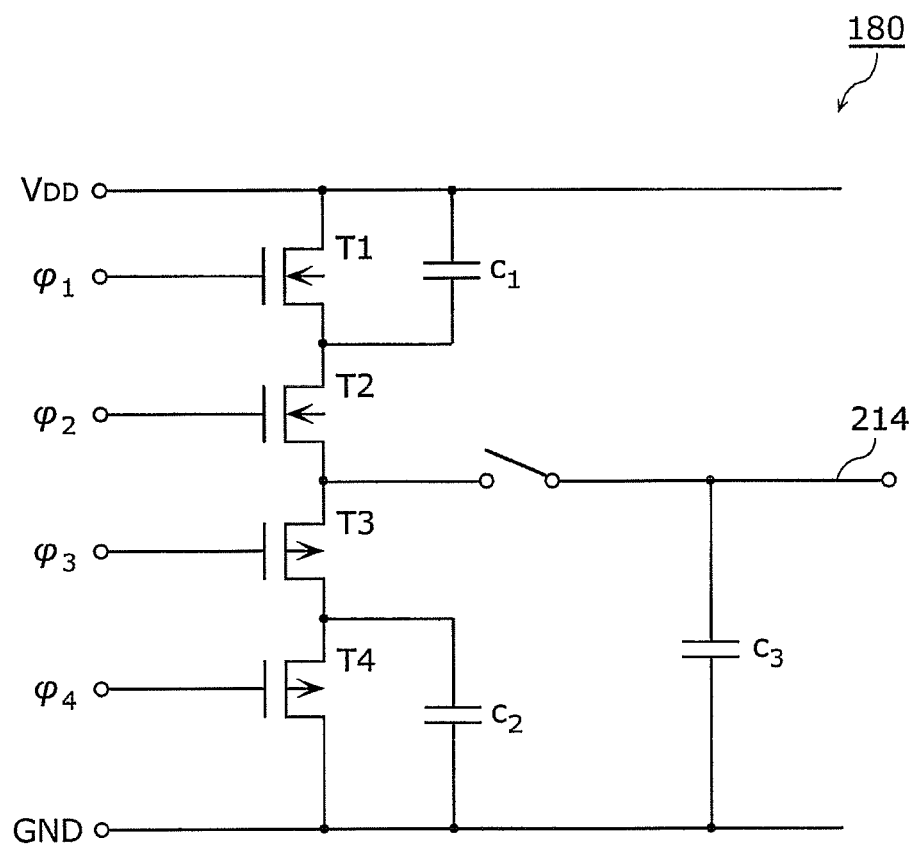
FIG. 3 is a circuit diagram which illustrates a structure of a step voltage providing circuit according to the first embodiment of the present embodiment.

FIG. 3 is a diagram which illustrates a circuit structure of the step voltage providing circuit 180.

In the circuit structure as illustrated in FIG. 3, a step voltage 214 of VDD/2 is generated by: inputting a clock signal $\phi 1$ into a gate of the transistor T1; inputting a clock signal $\phi 2$ that is the same cycle as and has a phase shifted by 180 degrees from the clock signal $\phi 1$ into a gate of the transistor T2; inputting a clock signal $\phi 3$ that is an inversion signal of a signal having a cycle twice as large as the clock signal $\phi 2$ into a gate of the transistor T3; inputting a clock signal $\phi 4$ that is an inversion signal of the clock signal $\phi 1$ into a gate of the transistor T4.

It is possible to provide VDD/2 with lower power consumption by using the step voltage providing circuit 180 that has the circuit structure as illustrated in FIG. 3.

Next, an outline of an operation of the display driving apparatus 100 will be described.

Figure 4:
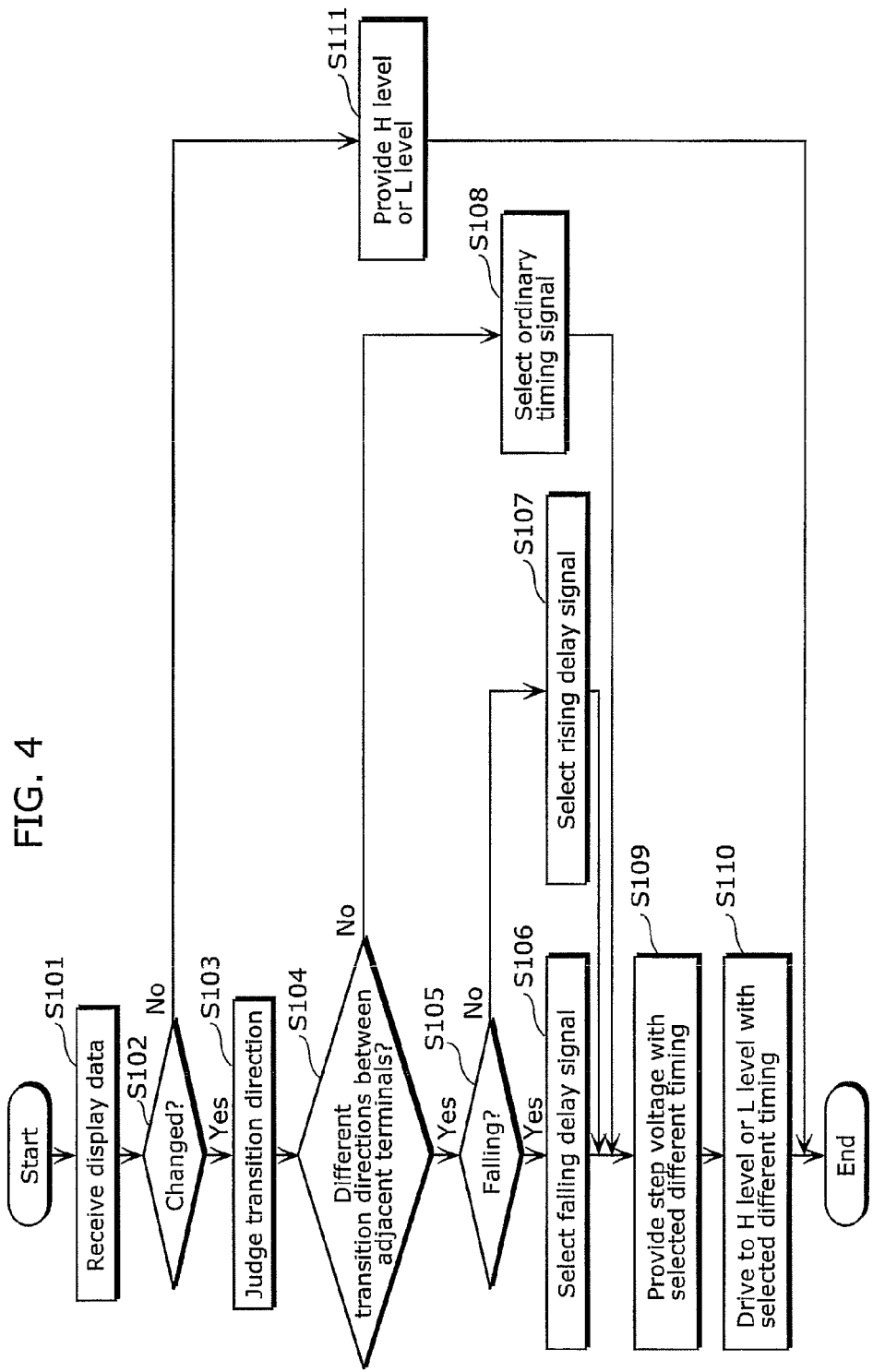
FIG. 4 is a flowchart which illustrates a flow of operations of the display driving apparatus according to the first embodiment of the present invention.

FIG. 4 is a flowchart which illustrates an operational flow of the display driving apparatus 100.

First, the serial display data 202 is stored in the shift register 110.

Next, the latch circuit 130 holds, as the pixel data 206a, the pixel data 204 held in the register 111 with a timing of change of the latch control signal 205 (S101).

The change judgment circuit 140 judges whether or not the pixel data 206a held by the latch circuit 130 has changed (S102).

When the pixel data 206a has changed (Yes in S102), the change judgment circuit 140 judges the transition direction of the pixel data 206a (S103).

Next, the transition direction match judgment circuit 330 judges whether or not the transition directions of the pixel data 206a and 206b are different (S104).

When the transition directions of the pixel data 206a and 206b are different (Yes in S104) and the transition direction of the pixel data 206a represents falling (Yes in S105), the delay selection circuit 320 selects the falling delay signal 216 obtained by delaying the latch control signal 205 that is an ordinary timing signal, and outputs the selected falling delay signal 216 as the timing control signal 219 (S106).

When the transition directions of the pixel data 206a and 206b are different (Yes in S104) and the transition direction of the pixel data 206a represents rising (No in S105), the delay selection circuit 320 selects the rising delay signal 217 obtained by delaying the latch control signal 205 that is an ordinary timing signal, and outputs the selected rising delay signal 217 as the timing control signal 219 (S107).

When the transition directions of the pixel data 206a and 206b are not different (No in S104), the delay selection circuit 320 selects the latch control signal 205 that is an ordinary timing signal, and outputs the selected latch control signal 205 as the timing control signal 219 (S108).

Next, the step control circuit 150 turns the first switch 170 off and the second switch 171 on, thereby providing the display output terminal 190 with the step voltage 214. Here, the n step control circuits 150, based on the timing control signal 219 which have been selected in Steps S106, S107, or S108 and changes with a different timing, starts providing the display output terminal 190 with the step voltage 214 with a different timing (S109).

Next, the step control circuit 150, after the voltage of the display output terminal 190 becomes the step voltage 214, turns the second switch 171 off and turns the first switch 170 on, thereby driving the display output terminal 190 to the H level or the L level voltage. Here, the n step control circuits 150, based on the latch control signal 205 which has been selected in Steps S106, S107, or S108 and changes with a different timing, starts driving the display output terminal 190 to the H level or the L level voltage with a different timing (S110).

On the other hand, in the case where the pixel data 206 has not changed (No, in S102), the step control circuit 150 turns the second switch 171 off and turns the first switch 170 on, thereby driving the display output terminal 190 to the H level or the L level voltage (S111).

It is to be noted that the processes as illustrated in FIG. 4 are performed by each structural element corresponding to each of the display output terminals 190.

An example of operations of the display driving apparatus 100 will be described in detail below.

First, an operation in the case where the transition directions of the pixel data 206a and 206b are the same will be described.

Figure 5:
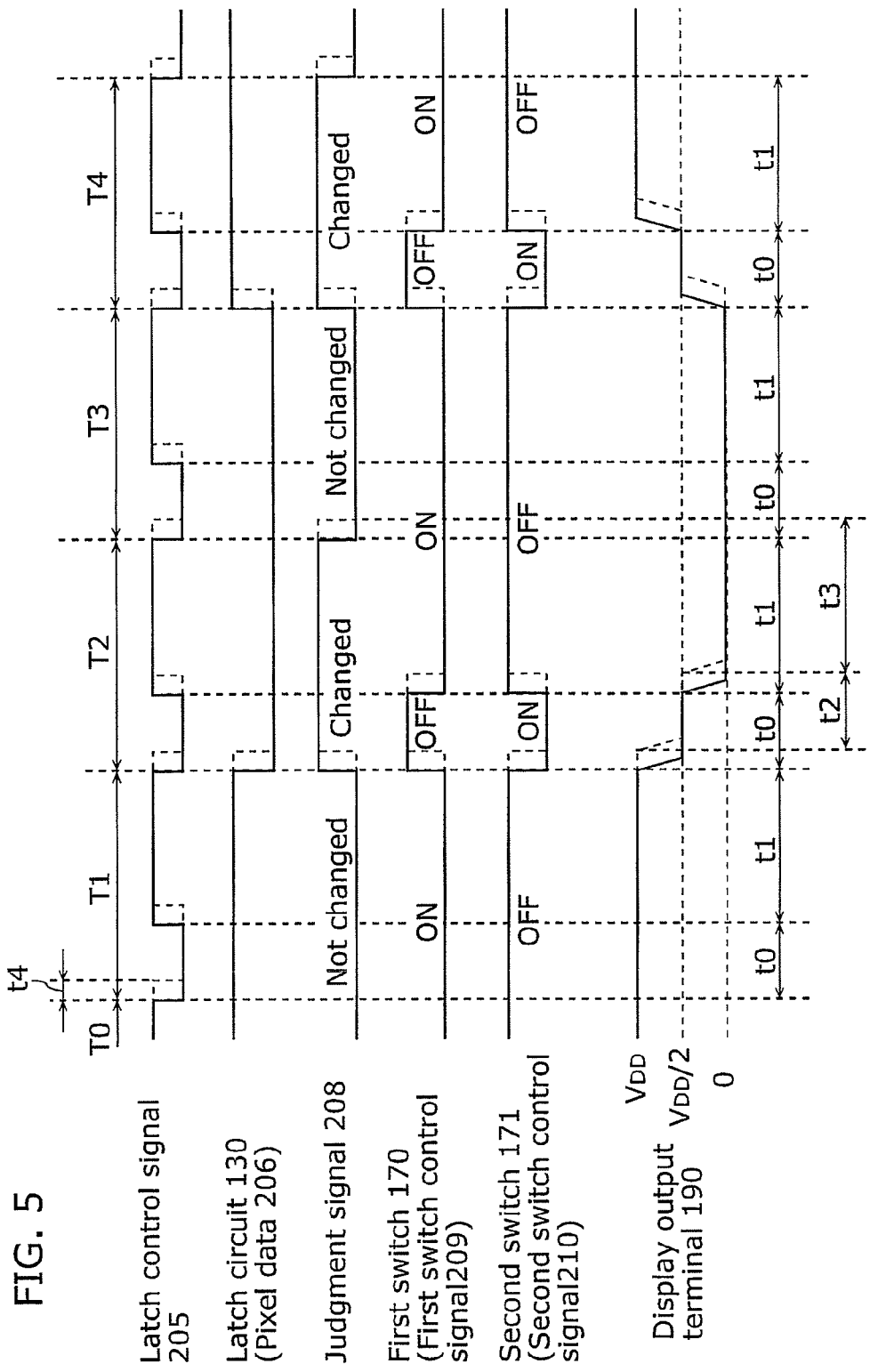
FIG. 5 is a timing chart which illustrates operations of the display driving apparatus according to the first embodiment of the present invention.

FIG. 5 is a timing chart which illustrates operations of the display driving apparatus 100.

In T0 which is a cycle of line data change, the latch circuit 130 holds the pixel data 206 of the H level and a voltage of the H level is outputted to the display output terminal 190.

In a cycle T1, the pixel data 204 is at the H level and the pixel data 206 held by the latch circuit 130 remains the same. Accordingly, the step control circuit 150 keeps the second switch 171 off and keeps the first switch 170 on during a first time period t0 and a second time period t1 .... The above structure causes the display output terminal 190 to maintain the H level (VDD) provided by the level shifter 161.

In a cycle T2, the pixel data 204 is at the L level and the pixel data 206 held by the latch circuit 130 changes from the H level to the L level.

Accordingly, the step control circuit 150 keeps the first switch 170 off and keeps the second switch 171 on during a first time period t0. The above structure causes the display output terminal 190 to be provided with a step voltage 214 (VDD/2) by the step voltage providing circuit 180, so that the voltage of the display output terminal 190 changes from the H level (VDD) to the step voltage 214 (VDD/2).

Furthermore, the step control circuit 150 keeps the second switch 171 off and keeps the first switch 170 on during the second time period t1. The above structure causes the display output terminal 190 to be provided with the L level (0 V) by the level shifter 161 during the second time period t1, so that the voltage of the display output terminal 190 changes from the step voltage 214 (VDD/2) to the L level (0 V).

In a cycle T3, the pixel data 204 is at the L level and the pixel data 206 held by the latch circuit 130 remains the same. Accordingly, the step control circuit 150 keeps the second switch 171 off and keeps the first switch 170 on during the first time period t0 and the second time period t1. The above structure causes the display output terminal 190 to maintain the L level (0 V) provided by the level shifter 161.

In a cycle T4, the pixel data 204 is at the H level and the pixel data 206 held by the latch circuit 130 changes from the L level to the H level.

Accordingly, the step control circuit 150 keeps the first switch 170 off and keeps the second switch 171 on during the first time period t0. The above structure causes the display output terminal 190 to be provided with the step voltage 214 (VDD/2) by the step voltage providing circuit 180 during the first time period t0, so that the voltage of the display output terminal 190 changes from the L level (0 V) to the step voltage 214 (VDD/2).

Furthermore, the step control circuit 150 keeps the second switch 171 off and keeps the first switch 170 on during the second time period t1. The above structure causes the display output terminal 190 to be provided with the H level (VDD) by the level shifter 161 during the second time period t1, so that the voltage of the display output terminal 190 changes from the step voltage 214 (VDD/2) to the H level (VDD).

As described above, the display driving apparatus 100 according to the first embodiment of the present invention drives the display output terminal 190 in two steps when the pixel data 206 changes. This structure allows the display driving apparatus 100 to reduce power consumption.

The principle of which power consumption is reduced by driving in two steps will be described below.

It is generally known that power consumption is proportional to (operating frequency)×(drive load capacity)×(drive voltage)$^2$. Here, in the case where the operating frequency (data transition cycle change time) is assumed to be constant, power consumption is proportional to (drive load capacity)×(drive voltage)$^2$.

Power consumption in the case where two-step drive is not used is expressed as Pm∝d Cm×Vm$^2$, where Pm is power consumption of an arbitrary drive terminal, Cm is total load capacity, and Vm is drive voltage amplitude.

On the other hand, when the step voltage is assumed to be ½ Vm, power consumption in the case where drive is performed in two steps (two divisions) is shown by the expression (1) below.

$$Pm \propto Cm \times (Vm/2)^2 \times 2 \text{(the number of times of division drive)} == 1/2 \times Cm \times (Vm)^2 \quad \text{Expression (1)}$$

As described above, the power consumption can be reduced to ½ by driving in two steps.

Furthermore, when the step voltage is assumed to be ⅓ and ⅔ Vm, the power consumption when drive is performed in three steps (three divisions) is shown by the expression (2) below.

$$Pm \propto Cm \times (Vm/3)^2 \times 3 = 1/3 \times Cm \times (Vm)^2 \quad \text{Expression (2)}$$

Similarly, when the step voltage is assumed to be a voltage that Vm is divided into n equal parts, power consumption when drive is performed in n (n is an integer equal to or greater than two) steps (n divisions) is shown by the expression (3) below.

$$Pm \propto 1/n \times Cm \times (Vm)^2 \quad \text{Expression (3)}$$

The power consumption can be reduced by increasing steps of division drive as shown in the above Expression (3).

In addition, when comparing the case where the step voltage is at an intermediate voltage level of Vm (Vm/2) to the case where the step voltage is not at the intermediate voltage level, the Expression (1) shows that the power consumption can be reduced more in the case where the step voltage is at the intermediate voltage level of Vm, even when the drive is performed in two steps in both of the cases.

Furthermore, with the display driving apparatus 100 according to the first embodiment of the present invention, since the step voltage 214 is provided to the display output terminal 190 by the step voltage providing circuit 180, the display output terminal 190 of which the pixel data 206 changes is constantly VDD/2 without depending on a pattern of the serial display data 202 during the first time period t0. More specifically, the display driving apparatus 100 according to the first embodiment of the present invention can constantly provide the step voltage 214 that can reduce power consumption most efficiently, without depending on the pattern of the serial display data 202. Therefore, the display driving apparatus 100 according to the first embodiment of the present invention can reduce consumption current more reliably than in the case where the step voltage depends on the pattern of the serial display data 202 as in the display driving apparatus disclosed in the Patent Reference 1.

Furthermore, in FIG. 5, the dotted lines indicate voltages of the latch control signal 205, the pixel data 206, the judgment signal 208, the first switch control signal 209, the second switch control signal 210, and the display output terminal 190, which are provided for a different display output terminals 190.

As illustrated in FIG. 5, the latch control signal 205 corresponding to a different display output terminal 190 changes with a timing delayed from the signal shown by the solid lines by a delay time t4 provided in the first delay circuit 120. The above structure causes the timing of change of the voltage of the pixel data 206, the judgment signal 208, the first switch control signal 209, the second switch control signal 210 and the display output terminal 190 to be delayed by the delay time t4.

More specifically, the step control circuit 150 keeps the first switch 170 off and the keeps the second switch 171 on during a first time period t2 that is delayed from the first time period t0 by the delay time t4. Furthermore, the step control circuit 150 keeps the second switch 171 off and the keeps the first switch 170 on during a second time period t3 that is delayed from the second time period t1 by the delay time t4.

Furthermore, n latch control signals 205 are provided with delay times t4 which are different from each other by the first delay circuit 120.

More specifically, the display driving apparatus 100 keeps the first switch 170 off and keep the second switch 171 on during the first time periods t0 and t2 each of which starts from a different time based on the timing of change of the n latch control signals 205.

Furthermore, the display driving apparatus 100 keeps the second switch 171 off and keep the first switch 170 on during the second time periods t1 and t3 each of which starts from a different time based on the timing of change of the n latch control signals 205. Accordingly, the display output terminal 190 is driven by the step voltage providing circuit 180 and the level shifter 161 with different timings.

With this, the display driving apparatus 100 according to the first embodiment of the present invention can lower peak current, thereby reducing the EMI when the serial display data 202 changes.

In addition, since the drive timing is different for every display output terminal 190, it is possible to reduce the EMI more efficiently compared to the display driving apparatus disclosed by the Patent Reference 2.

A structure of the step control circuit 150 will be described in detail below.

Figure 6:
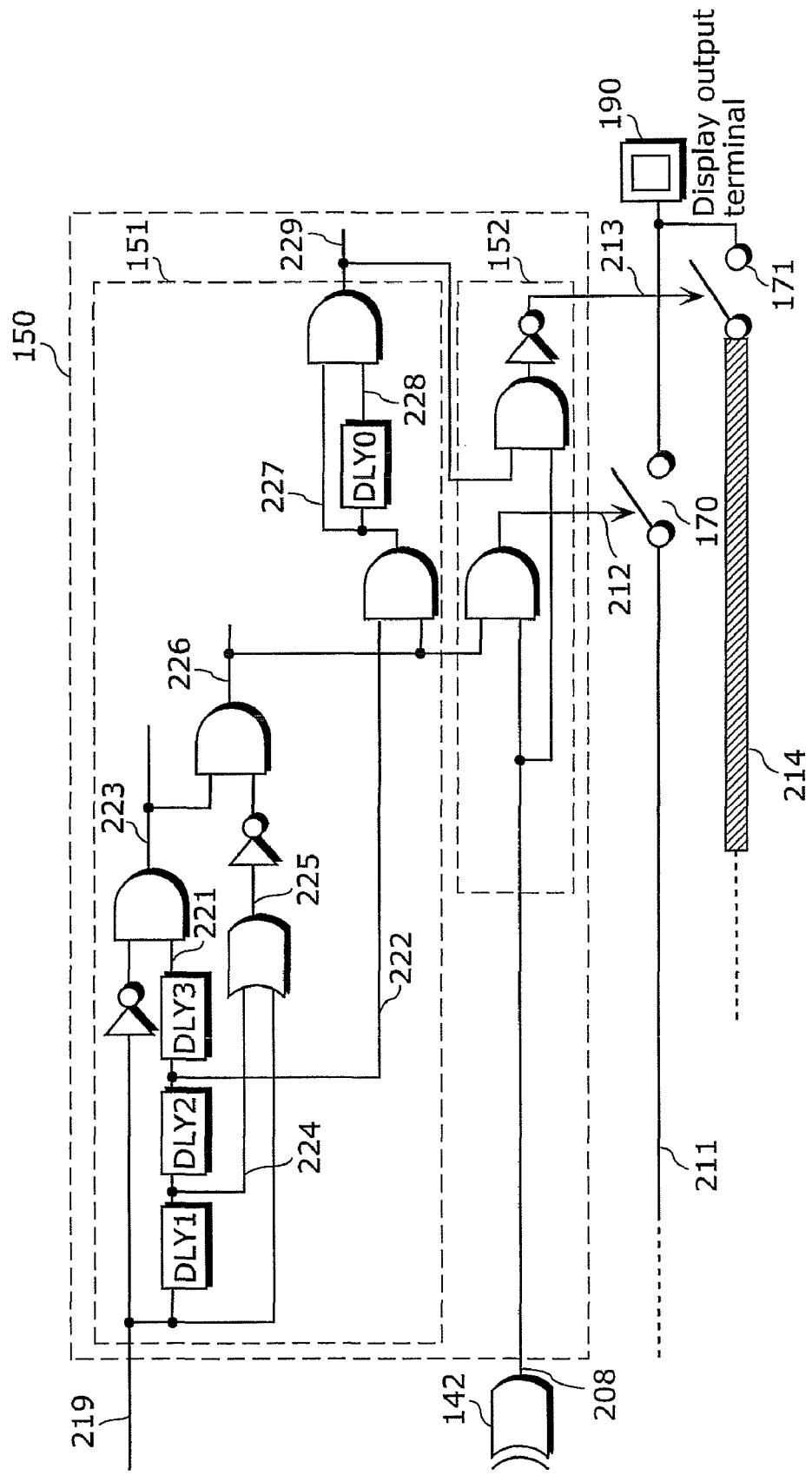
FIG. 6 is a circuit diagram which illustrates a structure of a step control circuit according to the first embodiment of the present embodiment.

FIG. 6 is a diagram which illustrates a circuit structure of the step voltage providing circuit 150. The step control circuit 150 includes a timing generation unit 151 and a change control unit 152.

It is to be noted that the level shifters 162 and 163 are omitted in FIG. 6.

The timing generation unit 151 generates a signal 226 and a signal 229 using the timing control signal 219. The signal 226 and the signal 229 are original signals of the first switch control signal 212 and the second switch control signal 213, respectively.

In the case where the pixel data 206 is judged to have changed due to a line data change (the case where the judgment signal 208 is at the L level), the change control unit 152 causes the first switch control signal 212 to be the L level and the second switch control signal 213 to be the H level constantly without depending on the logical values of the signal 226 and the signal 229. In other words, the first switch 170 is turned on and the second switch 171 is turned off.

Figure 7:
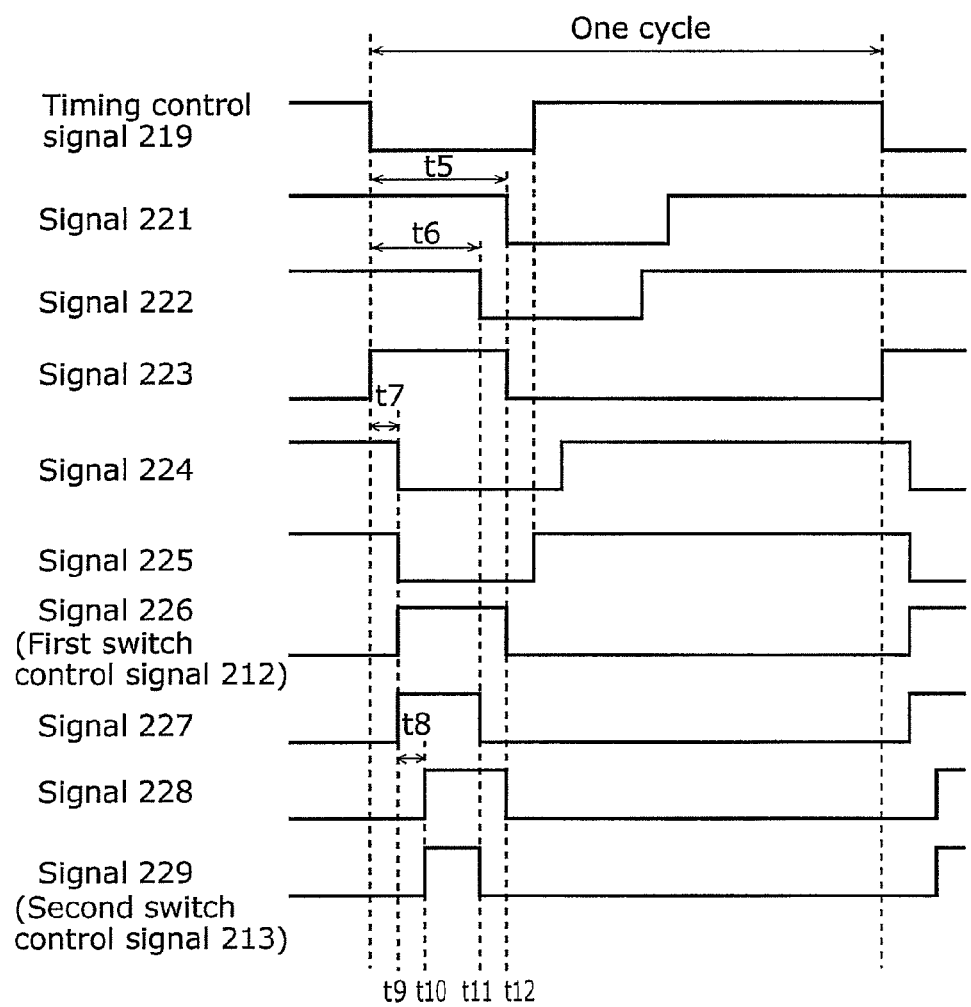
FIG. 7 is a timing chart which illustrates operations of the step control circuit according to the first embodiment of the present invention.

FIG. 7 is a timing chart which illustrated an operation for one cycle of the timing generation unit 151. The signals 221 to 229 are those shown in FIG. 6.

In FIG. 7, a time t5 is a sum of delay time of delay elements DLY1, DLY2, and DLY3, a time t6 is a sum of delay time of delay elements DLY1 and DLY2, a time t7 is a delay time of delay element DLY1, and a time t8 is a delay time of delay element DLY0. Each of the delay time of the delay elements DLY0 and DLY1 is smaller than the delay time of the delay element DLY2.

The signal 226 is an original signal of the first switch control signal 212. The first switch 170 turns off when the signal 226 is at the H level, and the first switch 170 turns on when the signal 226 is at the L level. The signal 229 is an original signal of the second switch control signal 213. The second switch 171 turns on when the signal 229 is at the H level, and the second switch 171 turns off when the signal 229 is at the L level.

As shown in FIG. 7, when the state where the first switch 170 is on and the second switch 171 is off changes to the state where the first switch 170 is off and the second switch 171 is on, the first switch 170 is turned off at the time t9 first, and then the second switch 171 is turned on at the time t10. In other words, both of the first switch 170 and the second switch 171 are kept off from the time t9 through the t10.

Furthermore, when the state where the first switch 170 is off and the second switch 171 is on changes to the state where the first switch 170 is on and the second switch 171 is off, the second switch 171 is turned off at the time t11 first, and then the first switch 170 is turned on at the time t12. In other words, both of the first switch 170 and the second switch 171 are kept off from the time t11 through the time t12.

In other words, the timing generation unit 151 turns the first switch 170 on after turning the second switch 171 off whenever turning the first switch 170 on. Furthermore, the timing generation unit 151 turns the second switch 171 on after turning the first switch 170 off whenever turning the second switch 171 on. In other words, the timing generation unit 151 keeps the first switch 170 and the second switch 171 not to be on at the same time.

With this, in the display driving apparatus 100 according to the first embodiment of the present invention, the first switch 170 and the second switch 171 are kept not to be on at the same time, so that an instantaneous data conflict can be avoided without fail. With this, the display driving apparatus 100 can reduce the EMI without fail.

Next, an operation of the display driving apparatus 100 in the case where the transition directions of the pixel data 206*a* and 206*b* are different will be described.

Figure 8:
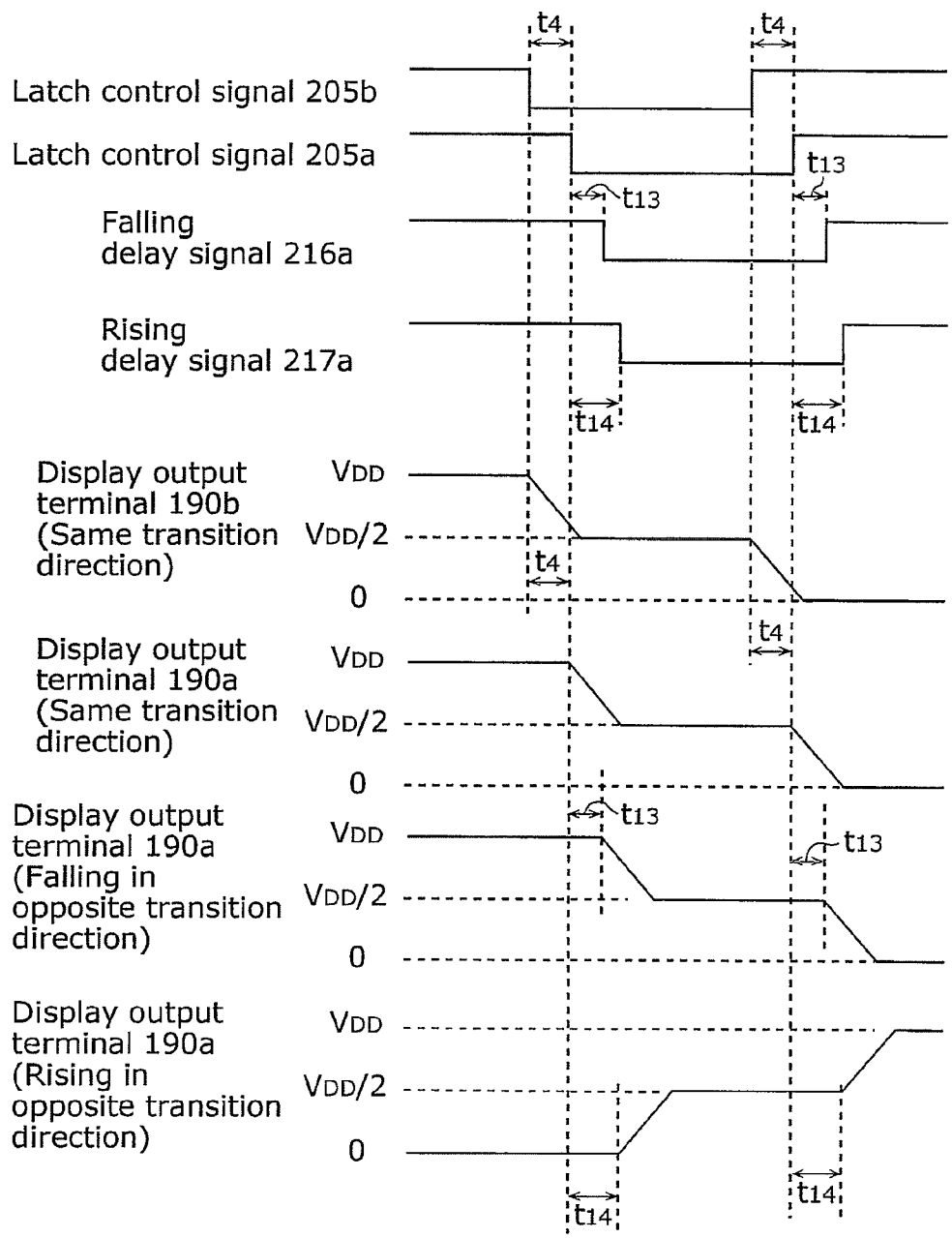
FIG. 8 is a timing chart which illustrates operations of the display driving apparatus according to the first embodiment of the present invention.

FIG. 8 is a timing chart which illustrates operations of the display driving apparatus 100 in the case where the transition directions are different. In FIG. 8 and in the following descriptions, the latch control signal 205, the falling delay signal 216, and the rising delay signal 217, which are provided for the display output terminal 190*a*, are indicated as the latch control signal 205*a*, the falling delay signal 216*a*, and the rising delay signal 217*a*, respectively, and the latch control signal 205 provided for the display output terminal 190*b* is indicated as the latch control signal 205*b*.

As shown in FIG. 8, the latch control signal 205*a* changes with a timing delayed from the latch control signal 205*b* by the delay time t4. The falling delay signal 216*a* changes with a timing delayed from the latch control signal 205*a* by the delay time t13. The rising delay signal 217*a* changes with a timing delayed from the latch control signal 205*a* by the delay time t14.

Thus, when the transition directions of the pixel data 206*a* and 206*b* are the same, the display output terminal 190*a* changes with a timing delayed from the display output terminal 190*b* by the delay time t4.

When the transition directions of the pixel data 206*a* and 206*b* are different and the transition direction of the pixel data 206*a* represents falling, the display output terminal 190*a* changes with a timing delayed from the display output terminal 190*b* by the delay times t4 plus t13.

When the transition directions of the pixel data 206*a* and 206*b* are different and the transition direction of the pixel data 206*a* represents rising, the display output terminal 190*a* changes with a timing delayed from the display output terminal 190*b* by the delay times t4 plus t14.

As above, when the pixel data 206*b* provided for the display output terminal 190*b* that is adjacent in the upward direction changes in a transition direction which is different from that of the pixel data 206*a*, the display driving apparatus 100 according to the first embodiment of the present invention changes the display output terminal 190*a* with a timing delayed from an ordinary timing. Since the timings of change of the plural display output terminals 190 are delayed sequentially from top to bottom in FIG. 1, the pixel data 206*b* for the display output terminal 190*b* adjacent in the upward direction is the pixel data 206 which changes with an immediately previous timing.

When the pixel data 206 for adjacent ones of the display output terminals 190 transit in opposite directions, the display output terminals 190 have increased drive load capacity, leading to an increased peak current. When the peak current increases as above, the display driving apparatus 100 according to the first embodiment of the present invention is capable of lowering such a peak current by further delaying a timing of change of the display output terminal 190.

In addition, the drive load capacity in the rising case is generally greater than the drive load capacity in the falling case and therefore leads to an increased peak current. On the other hand, when the pixel data 206*a* and 206*b* for the adjacent display output terminals 190*a* and 190*b* transit in opposite directions and the transition direction of the pixel data 206*a* represents rising, the display driving apparatus 100 according to the first embodiment of the present invention further delays a timing of change of the display output terminal 190*a* as compared to when the transition direction of the pixel data 206*a* represents falling. With this, the display driving apparatus 100 according to the first embodiment of the present invention can lower the peak current.

As described above, in the display driving apparatus 100 according to the first embodiment of the present invention, the pixel data 206 to be outputted to plural display output terminals 190 is driven with different starting timings. With this, the display driving apparatus 100 can lower the peak current, thereby reducing the EMI noise related to display driving.

Furthermore, when the pixel data 206 changes, the display driving apparatus 100 first drives the voltage of the display output terminal 190 to the step voltage 214 that is provided by the step voltage providing circuit 180, and then drives to VDD or GND. More specifically, the display driving apparatus 100 drives the display output terminal 190 with two divisions using a two-step voltage level. Here, the power consumption is proportional to the square of the voltage level at which the driving operation is performed. More specifically, the power consumption can be reduced to a lower level by driving the display output terminal 190 with two divisions as compared to the case where the display output terminal 190 is driven from GND to VDD or from VDD to GND.

It is to be noted that the step voltage 214 that is provided by the step voltage providing circuit 180 is not limited to the intermediate voltage level of VDD and GND (VDD/2), and may be any voltage level between VDD and GND. It is to be noted that, considering the effect of reducing power consumption, it is preferable that the step voltage 214 is VDD/2.

Furthermore, with the display driving apparatus 100, in the case where transitions of the respective pixel data 206 for the plural display output terminals 190 are opposite in voltage level, for example, in the case where the voltage of one of the display output terminals 190 changes from the L level to the H level, and the voltage of another one of the display output terminals 190 changes from the H level to the L level, electric charges accumulated in the display output terminals 190 are shared via the common line through which the step voltage 214 is provided from the step voltage providing circuit 180. The above structure makes it possible to reduce power consumption of the step voltage providing circuit 180.

Furthermore, when transition directions of the pixel data 206 for adjacent ones of the display output terminals 190 are different, the display driving apparatus 100 changes the display output terminals 190 with a timing delayed from an ordinary timing. With this, the display driving apparatus 100 can lower a peak current.

Furthermore, when the transition direction of the pixel data 206 represents rising, the display driving apparatus 100 further delays a timing of change of the display output terminal 190, as compared to the case where the transition direction of the pixel data 206 represents falling. With this, the display driving apparatus 100 can lower a peak current.

As described above, the display driving apparatus 100 can attain both lowering power consumption and lowering the EMI.

Furthermore, with the display driving apparatus 100, since the display output terminals 190 are driven to the step voltage 214 with different timings, it is possible to lower a peak of load for the step voltage providing circuit 180.

While the first delay circuit 120 includes the n−1 delay elements 121 connected in series in the above descriptions, n delay elements connected in series may be included instead. In this case, n signals outputted from the delay elements 121 connected in series are the n latch control signals 205.

Furthermore, while the display driving apparatus 100 drives the plural display output terminals 190 to the step voltage with different timings in the above descriptions, the display output terminals 190 may be driven to the step voltage with the same timing and then driven to the L level or the H level with different timings.

Furthermore, while the display driving apparatus 100 includes the second delay circuit 310 and the delay selection circuit 320 for the display output terminal 190 placed at the upper end in FIG. 1 in the above descriptions, at least one of the second delay circuit 310 and the delay selection circuit 320 may not be provided. This means that the display driving apparatus 100 needs only n−1 second delay circuits 310 and delay selection circuits 320 for the n display output terminals 190.

Second Embodiment

In a second embodiment of the present invention, a display module package, a display panel module, and a television set which include the display driving apparatus 100 according to the above-described embodiment will be described.

Figure 9:
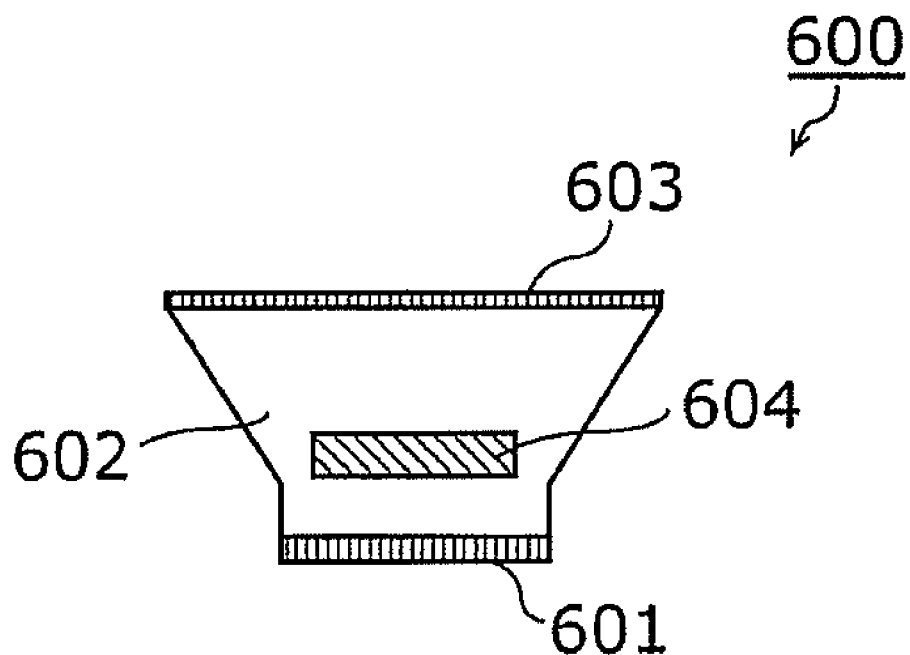
FIG. 9 is a top plan view which illustrates a structure of a module package according to a second embodiment of the present invention.

FIG. 9 is a top plan view which illustrates a structure of a display module package which uses the display driving apparatus 100 according to an implementation of the present invention.

A display module package 600 as illustrated in FIG. 9 includes: a display input signal connection terminal 601; a flexible printed circuit board (FPC) 602; a display output connection terminal 603; and a data driver 604.

The data driver 604 corresponds to the display driving apparatuses 100 according to the implementation of the present invention described above.

The display input signal connection terminal 601 is connected to a signal input terminal of the data driver 604 (a terminal to which a horizontal synchronization signal 201, serial display data 202, a pixel clock 203, and the like are inputted) via the FPC 602.

The display output connection terminal 603 is connected to plural display output terminals 190 of the data driver 604.

Figure 10:
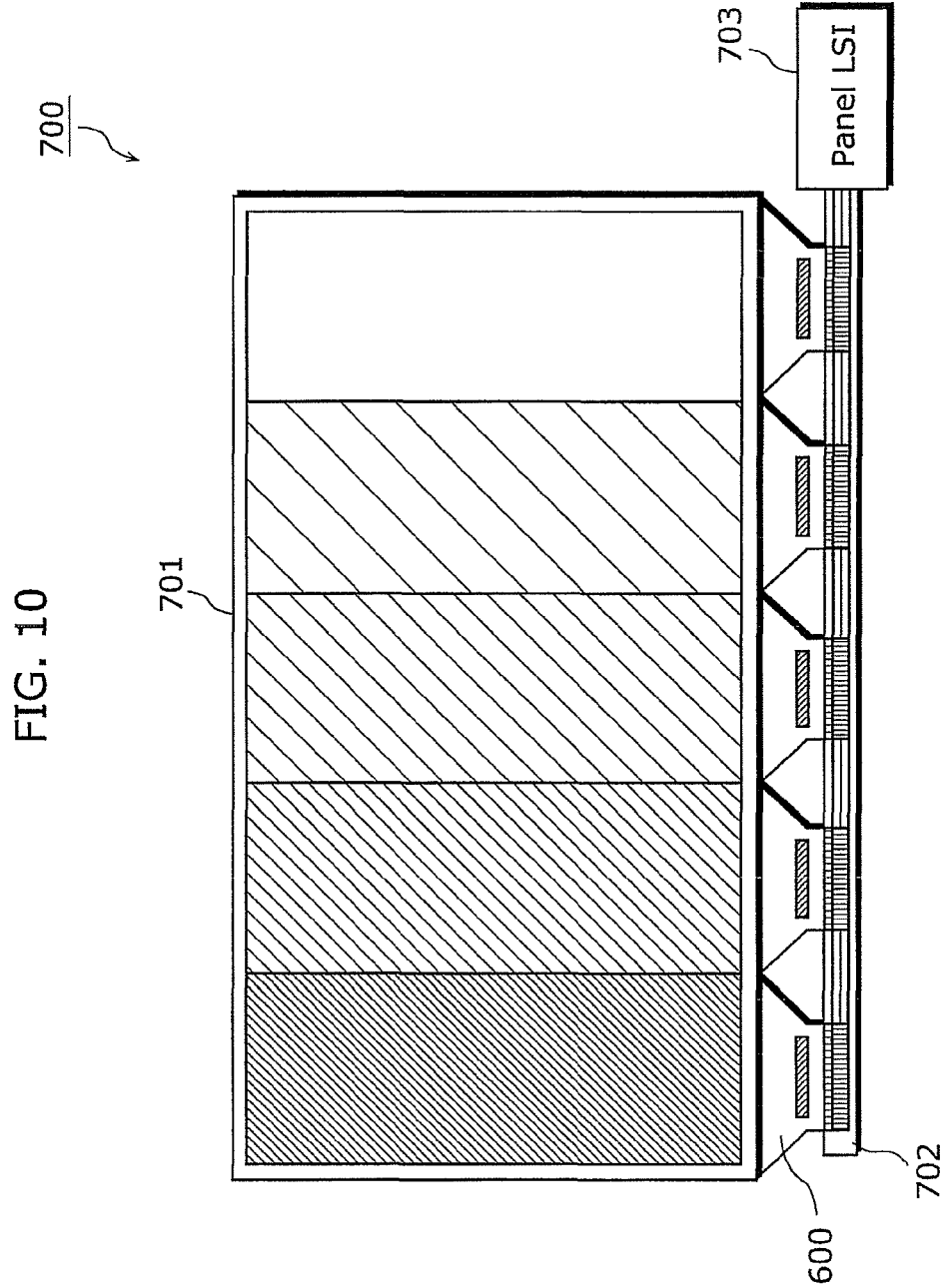
FIG. 10 is a top plan view which illustrates a structure of a panel module according to the second embodiment of the present invention.

FIG. 10 is a top plan view which illustrates a structure of a panel module including the display module package 600.

A display panel module 700 as illustrated in FIG. 10 includes: the plural display module packages 600; a PDP panel 701; a common display input circuit board 702; and a panel LSI 703.

Each of the display output connection terminals 603 of the plural display module packages 600 is connected to the PDP panel 701.

The panel LSI 703 generates a signal (the horizontal synchronization signal 201, the serial display data 202, the pixel clock 203, and the like) which controls display driving of the PDP panel 701, and outputs the generated signal to the display input signal connection terminal 601 of the plural display module packages 600 via the common display input circuit board 702.

As described above, a single display module package 600 is used for each column of plural divisions of the PDP panel 701. By having such a structure, power consumption reduction in each of the data drivers 604 significantly contributes to power consumption reduction in the entire display panel module 700.

Figure 11:
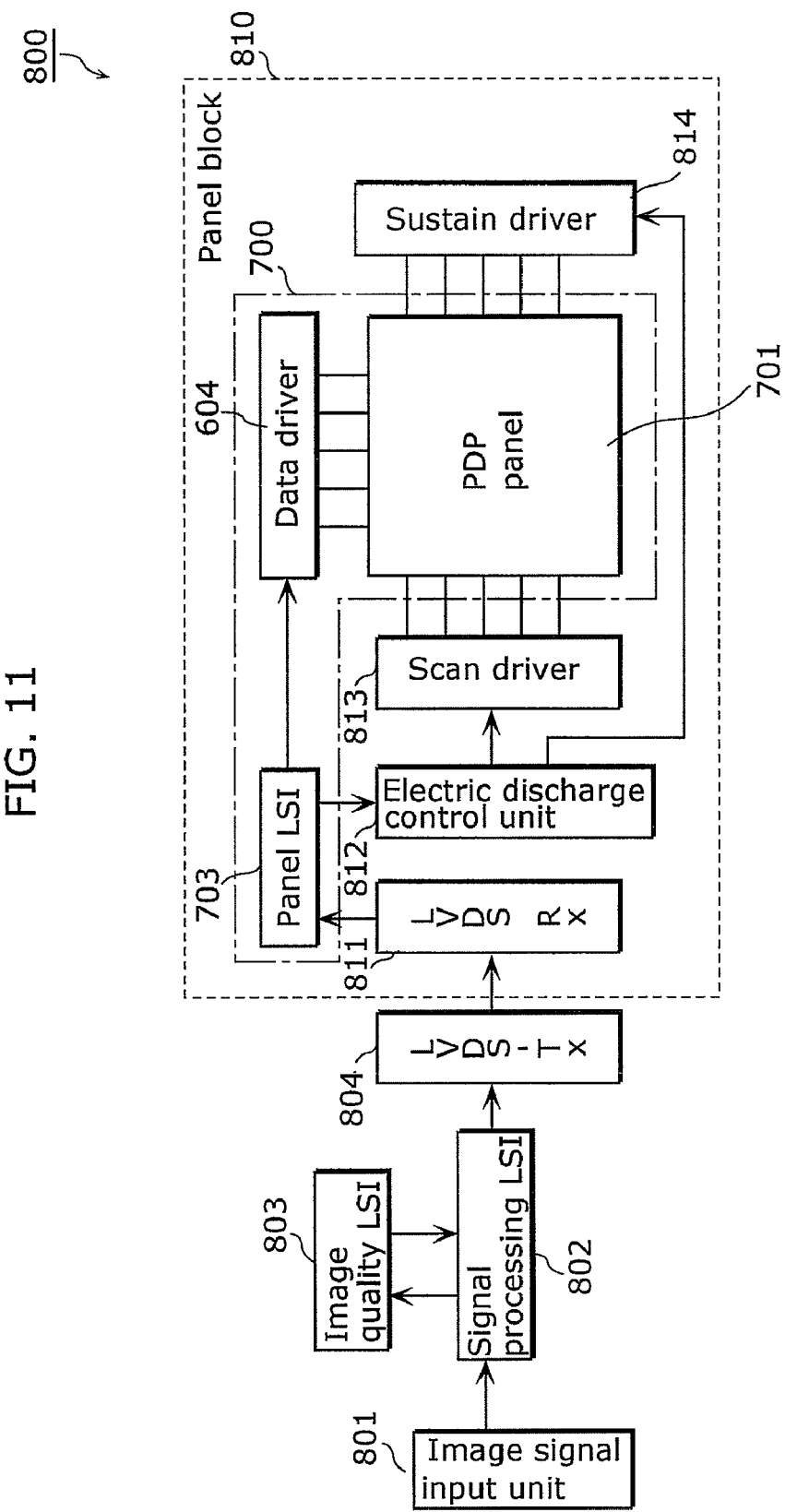
FIG. 11 is a block diagram which illustrates a structure of a television set according to the second embodiment of the present invention.

FIG. 11 is a block diagram which illustrates a structure of a PDP television set which includes the display panel module 700.

The television set 800 as illustrated in FIG. 11 includes: an image signal input unit 801; a signal processing LSI 802; an image quality LSI 803; a low voltage differential signaling (LVDS) transmitter (LVDS-Tx) 804; and a panel block 810. The panel block 810 includes: an LVDS receiver (LVDS-Rx) 811, an electric discharge control unit 812; a scan driver 813; a sustain driver 814; the display panel module 700; and the data driver 604.

An image data to be displayed on the PDP panel 701 is inputted into the image signal input unit 801.

The signal processing LSI 802 and the image quality LSI 803 perform signal processing such as image quality adjustment on the image data inputted into the image signal input unit 801.

The LVDS transmitter 804 converts the image data signal-processed by the signal processing LSI 802 into two differential signals.

The LVDS receiver 811 restores the differential signals converted by the LVDS transmitter 804 to be normal signals. By utilizing the LVDS, power consumption can be reduced.

The panel LSI 703 generates serial display data 202, a horizontal synchronization signal 201, a vertical synchronizing signal, and the like based on the image data (display data) restored by the LVDS receiver 811.

The data driver 604 drives a data electrode of the PDP panel 701 according to the serial display data 202 generated by the panel LSI 703.

The electric discharge control unit 812 performs such controls as a subfield control, an auxiliary electric discharge control, and a gradation control of display data. The electric discharge control unit 812 generates a control signal that controls the scan driver 813 and the sustain driver 814 based on the horizontal synchronization signal 201 and the vertical synchronizing signal.

The scan driver 813 and the sustain driver 814 respectively drive a scan electrode and a sustain electrode of the PDP panel 701 based on the control signal generated by the electric discharge control unit 812.

As described above, the display driving apparatuses 100 according to the implementation of the present invention can easily be incorporated into an image display system such as the television set 800 that is provided with a display panel such as the PDP.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is applicable to display driving apparatuses, and in particular to a driver of a display panel that includes capacitive load such as the PDP or an electroluminescence (EL) panel.

What is claimed is:
1. A display driving apparatus which outputs n drive signals to n display output terminals in a predetermined cycle according to n pixel data included in display data for a single line, n being an integer equal to or greater than two, and each of the n drive signals driving a panel electrode, said display driving apparatus comprising:
a change judgment unit configured to (i) judge whether or not each of the n pixel data has changed from pixel data of an immediately previous cycle, and when judging that each of the n pixel data has changed, further (ii) judge whether each of the n pixel data has changed from a first logical value to a second logical value or from the second logical value to the first logical value;

n−1 transition direction match judgment units each provided between an adjacent two of the display output terminals and configured to judge whether or not the pixel data for the two adjacent display output terminals have changed in different directions;

a first delay unit configured to generate n first timing signals based on a horizontal synchronization signal that synchronizes with the cycle, the n first timing signals corresponding one-to-one with the n display output terminals and changing with different timings;

n−1 second delay units configured to delay n−1 first timing signals among the n first timing signals to generate n−1 second timing signals corresponding one-to-one with the n−1 display output terminals;

n−1 delay selection units corresponding one-to-one with the n−1 display output terminals and each configured to (i) select a corresponding one of the second timing signals when the pixel data for a corresponding one of the display output terminals and the pixel data for another one of the display output terminals which is adjacent to the corresponding display output terminal have changed in different directions, and (ii) select a corresponding one of the first timing signals when the pixel data for the corresponding display output terminal and the pixel data for the other display output terminal adjacent to the corresponding display output terminal have changed in a same direction; and a control unit configured to drive the corresponding display output terminal with a timing of change of the first timing signal or the second timing signal selected by each of said n−1 delay selection units.

2. The display driving apparatus according to claim 1, wherein said control unit is configured to (i) drive one of the display output terminals to a first voltage when the pixel data for the corresponding display output terminal is the first logical value, and (ii) drive one of the display output terminals to a second voltage when the pixel data for the corresponding display output terminal is the second logical value, the second voltage being higher than the first voltage, each of the n−1 second timing signals includes a falling timing signal and a rising timing signal, said n−1 second delay units are configured to (i) delay the first timing signals by a first delay amount to generate the n−1 falling timing signals corresponding one-to-one with the n−1 display output terminals, and (ii) delay the first timing signal by a second delay amount to generate the n−1 rising timing signals corresponding one-to-one with the n−1 display output terminals, the second delay amount being larger than the first delay amount, and each of said n−1 delay selection units is configured to (i) select the falling timing signal when the pixel data for the corresponding display output terminal and the pixel data for the other display output terminal adjacent to the corresponding display output terminal change in different directions, and the pixel data for the corresponding display output terminal changes from the second logical value to the first logical value, and (ii) select the rising timing signal when the pixel data for the corresponding display output terminal and the pixel data for the other display output terminal adjacent to the corresponding display output terminal change in different directions, and the pixel data for the corresponding display output terminal changes from the first logical value to the second logical value.

3. The display driving apparatus according to claim 1, wherein said first delay unit is configured to generate the n first timing signals such that a timing of change is delayed sequentially in an order of an arrangement of the n display output terminals, said transition direction match judgment units correspond one-to-one with the n−1 display output terminals and are each configured to judge whether or not the pixel data for a corresponding one of the display output terminals and the pixel data for another one of the display output terminals which is located immediately before the corresponding display output terminal in the order of the arrangement have changed in different directions, and each of said n−1 delay selection units is configured to (i) select the corresponding second timing signal when the pixel data for the corresponding display output terminal and the pixel data for the other display output terminal located immediately before the corresponding display output terminal in the order of the arrangement have changed in different directions, and (ii) select the corresponding first timing signal when the pixel data for the corresponding display output terminal and the pixel data for the other display output terminal located immediately before the corresponding display output terminal in the order of the arrangement have changed in a same direction.

4. The display driving apparatus according to claim 1, further comprising:

n level shift units corresponding one-to-one with the n pixel data and the n display output terminals, and configured to shift a voltage level of corresponding pixel data and output a first voltage or a second voltage; and a step voltage providing unit configured to provide a step voltage which is at a voltage level between the first voltage and the second voltage, wherein said control unit is configured to perform control such that the display output terminal corresponding to the pixel data judged to have changed by said change judgment unit is provided with: the step voltage provided by said step voltage providing unit during a first time period included in each of the cycle; and either the first voltage or the second voltage outputted from said corresponding level shift units during a second time period that is contained in the cycle and subsequent to the first time period, and said control unit is configured to determine at least one of the first time period and the second time period based on a timing of change of either the first timing signal or the second timing signal selected by each of said n−1 delay selection units.

5. The display driving apparatus according to claim 4, further comprising:

n latch units corresponding one-to-one with the n pixel data, and configured to hold the corresponding pixel data with a timing based on the horizontal synchronization signal and output the pixel data which has been held;

n first switches corresponding one-to-one with the n pixel data, said n level shift units, and the n display output terminals, each of said n first switches being connected between an output terminal of a corresponding one of said level shift units and a corresponding one of the display output terminals; and n second switches corresponding one-to-one with the n pixel data, said n first switches, and the n display output terminals, each of said n second switches being connected between an output terminal of said step voltage providing unit and a corresponding one of the display output terminals, wherein said control unit is configured to keep said first switch off and keep said second switch on during the first time period, and keep said second switch off and keep said first switch on during the second time period, each of said first switch and said second switch corresponding to the pixel data judged to have changed by said change judgment unit.

6. The display driving apparatus according to claim 5, wherein said first delay unit is configured to generate the n timing signals by providing the horizontal synchronization signal with a delay that is different for each timing signal, and said control unit is configured to keep said n first switches off and keep said n second switches on during the first time periods that are different from one another and based on the timing of change of the n timing signals.

7. The display driving apparatus according to claim 5, wherein said control unit is configured to keep one of said second switches off and keep a corresponding one of said first switches on during the first time period and the second time period in the case where said change judgment unit judges that the pixel data held by a corresponding one of said latch units has not changed.

8. The display driving apparatus according to claim 5, wherein the step voltage is at an intermediate voltage level between the first voltage and the second voltage.

9. The display driving apparatus according to claim 5, wherein said control unit is configured to keep said corresponding first switch and second switch not to be concurrently on.

10. The display driving apparatus according to claim 9, wherein said control unit is configured to perform control such that said first switch is turned on after said second switch corresponding to said first switch is tuned off whenever said first switch is turned on, and that said second switch is turned on after said first switch corresponding to said second switch is turned off whenever said second switch is turned on.

11. A display module package comprising a display driving apparatus recited in claim 1.

12. A display panel module comprising a display module package recited in claim 11.

13. A television set comprising a display panel module recited in claim 12.

* * * * *